(12) United States Patent
Wall et al.

(10) Patent No.: US 7,596,801 B2
(45) Date of Patent: Sep. 29, 2009

(54) SINGLE WIRE RETURN DEVICE IN A FIBER TO THE HOME SYSTEM

(75) Inventors: William E. Wall, Atlanta, GA (US); William C. Versteeg, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 917 days.

(21) Appl. No.: 10/671,151

(22) Filed: Sep. 25, 2003

(65) Prior Publication Data
US 2005/0044576 A1  Feb. 24, 2005

Related U.S. Application Data

(60) Provisional application No. 60/441,462, filed on Jan. 21, 2003.

(51) Int. Cl.
*H04N 7/173* (2006.01)
(52) U.S. Cl. ............................ 725/129; 398/71; 398/72; 398/79; 398/138; 725/105; 725/109; 725/111; 725/113; 725/127; 725/131; 725/128; 370/206; 370/485
(58) Field of Classification Search .................. 725/105, 725/114, 127, 128, 129; 370/206, 485; 398/71, 398/138, 72, 79
See application file for complete search history.

(56) References Cited

U.S. PATENT DOCUMENTS

| 4,686,564 | A  | * | 8/1987  | Masuko et al. ............... 725/120 |
| 5,481,542 | A  | * | 1/1996  | Logston et al. .............. 725/131 |
| 5,872,644 | A  | * | 2/1999  | Yamazaki et al. .............. 398/63 |
| 5,995,258 | A  | * | 11/1999 | Weber et al. ................. 398/125 |
| 6,735,221 | B1 | * | 5/2004  | Cherubini .................... 370/485 |
| 6,771,908 | B2 | * | 8/2004  | Eijk et al. ..................... 398/66 |
| 6,857,132 | B1 | * | 2/2005  | Rakib et al. .................. 725/114 |
| 7,184,664 | B2 | * | 2/2007  | Farmer et al. ................. 398/72 |
| 7,190,901 | B2 | * | 3/2007  | Farmer et al. ................. 398/67 |
| 7,209,667 | B2 | * | 4/2007  | Lindblad ..................... 398/164 |
| 7,222,358 | B2 | * | 5/2007  | Levinson et al. ............. 725/121 |
| 2002/0063924 | A1 | * | 5/2002 | Kimbrough et al. ......... 359/125 |
| 2004/0257976 | A1 | * | 12/2004 | Alsobrook et al. .......... 370/206 |

* cited by examiner

*Primary Examiner*—Scott Beliveau
*Assistant Examiner*—Alan Luong
(74) *Attorney, Agent, or Firm*—Tarolli, Sundheim, Covell & Tummino LLP

(57) ABSTRACT

Systems and methods are disclosed for providing reverse signals from a plurality of DHCTs to a downstream modulator that is located in the headend facility. The present invention includes a single wire return device (SWRD) that receives RF modulated signals, dynamically determines the address of the associated modulator, and converts the signals into Ethernet signals. The Ethernet signals are subsequently provided to the headend facility via fiber cable.

7 Claims, 4 Drawing Sheets

SINGLE WIRE RETURN DEVICE IN A FIBER TO THE HOME SYSTEM

CROSS-REFERENCE TO RELATED PATENT APPLICATIONS

The present application incorporates by reference in its entirety herein copending U.S. provisional application having Ser. No. 60/441,462, which was filed on Jan. 21, 2003.

FIELD OF THE INVENTION

This invention relates in general to broadband communications systems, and more particularly, to the field of set-top terminals and a networked multimedia system.

DESCRIPTION OF THE RELATED ART

Conventionally, broadband communications systems, such as cable television systems, provide cable television signals and related services including interactive media, telephony signals over a hybrid fiber/coax system. FIG. 1 illustrates a conventional broadband communications system for transmitting forward and reverse audio/video and data signals. In a headend facility 105, a digital network control system (DNCS) 110 transmits and receives signals from a plurality of digital home communications terminals (DHCTs) 145 installed in the system. In the downstream path, or forward path, signals (e.g., audio/video signals or data signals) are modulated by a quaternary phase shift keying (QPSK) downstream modulator 115. It will be appreciated that though only one downstream modulator 115 is shown, there are typically many modulators in the headend facility 105. The signals are typically converted into optical signals and transported over a fiber medium 120 to a node 125. The node 125, in a known manner, converts the optical signals into radio frequency (RF) signals for further transmission over coaxial cable 130. Taps 135, or splitters, split the signal and transmit the split signal to a plurality of subscriber premises 140. It will be appreciated that each premises 140 can include a plurality of DHCTs 145. Each DHCT 145 then receives the forward signals, which is either broadcast to several DHCTs 145 or transmitted to a specific DHCT 145, and an internal QPSK demodulator 150 demodulates the signal in order to provide an appropriate format for viewing and hearing the signals.

In the upstream path, or reverse path, reverse signals (e.g., data or control signals) originating in the DHCT 145 are modulated with a QPSK modulator 155 and transmitted upstream to a QPSK demodulator 160(a-n) located in the headend facility 105. Several demodulators (e.g., eight demodulators) are collocated with and each directly coupled to the QPSK downstream modulator 115 via a cable. If a DHCT 145 sends a reverse control signal that requests return signals, the appropriate downstream modulator 115 that is associated with the sending DHCT 145 responds due to a direct coupling between a DHCT 145, a demodulator 160, and a modulator 115.

FIG. 2 illustrates an example of a fiber-to-the-home (FTTH) system 200. As products and technology evolved, the coaxial cable 130 was replaced with fiber cable 120 that runs directly to the premises 145. A headend facility 205, which can be operated by a cable operator or a telephone operator, delivers telephone, audio/video, and data signals over fiber cable 210 to the premises 215. A fiber splitter 220 may be used to route fiber cable 210 to a plurality of premises 215. An optical network terminal (ONT) 225 receives the signals and provides the signals to a plurality of output ports depending upon the type signal. For example, one port may be used for plain old telephone service (POTS); another port may deliver audio/video signals over coaxial cable to a DHCT 230; and a further port may be used to route Ethernet, or data, signals to computers.

In the headend facility 205, the QPSK downstream modulator 115 provides audio/video signals, which are typically radio frequency (RF) signals to an optical network 235. The optical network 235 converts the RF signals into optical signals for transport through the network. An Internet protocol (IP) network 245 receives any Internet signals from connected equipment and routes them to the optical network 235 for transport through the network.

Despite the advantages of running fiber to an ONT 225 in the forward path, there are disadvantages in the reverse path. For example, the DHCT 230 is not able to send reverse RF signals in an FTTH system 200 as in the conventional HFC system 100 of FIG. 1. One reason is that the ONT 225 currently has a limit of only two wavelengths that are used to receive and transmit signals and cannot, therefore, transmit reverse RF signals. It is possible to work around this weakness by converting the RF signals in the DHCT 230 to Ethernet signals and running an Ethernet cable 235 from each DHCT 230 to the ONT 225, thereby sending Ethernet signals rather than RF signals. An Ethernet connector (not shown) on the DHCT 230 then transmits the Ethernet signals to the ONT 225 where they are converted into optical signals and then transmitted to the HE 205. Supplying DHCTs 230 with Ethernet connectors and running Ethernet cable from each DHCT 230 to the ONT 225, however, is extremely costly and laborious. What is needed, therefore, is a method and apparatus that allows the DHCT 230 to efficiently transmit reverse RF signals in a FTTH system 200.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Furthermore, the DHCTs can operator independently or as remote devices in a premises network. All examples given herein, therefore, are intended to be non-limiting and are provided in order to help clarify the description of the invention.

The present invention is directed towards a device that efficiently transmits signals in a FTTH system. More specifically, a single wire return device (SWRD) located at a subscriber premises transmits and receives forward and reverse signals, respectively, between an ONT and at least one DHCT. The SWRD is a data conversion device that receives Internet protocol (IP) over DAVIC QPSK from a DHCT, demodulates the QPSK signals, processes the IP packets, and forwards the packets on an Ethernet network to a headend facility. Advantageously, by using the SWRD, the requirement for an Ethernet cable connecting a DHCT to an ONT in order to transmit the reverse signals is no longer necessary. Additionally, hardware changes to the ONT and DHCTs are not necessary in order to implement the present invention.

Figure 3:
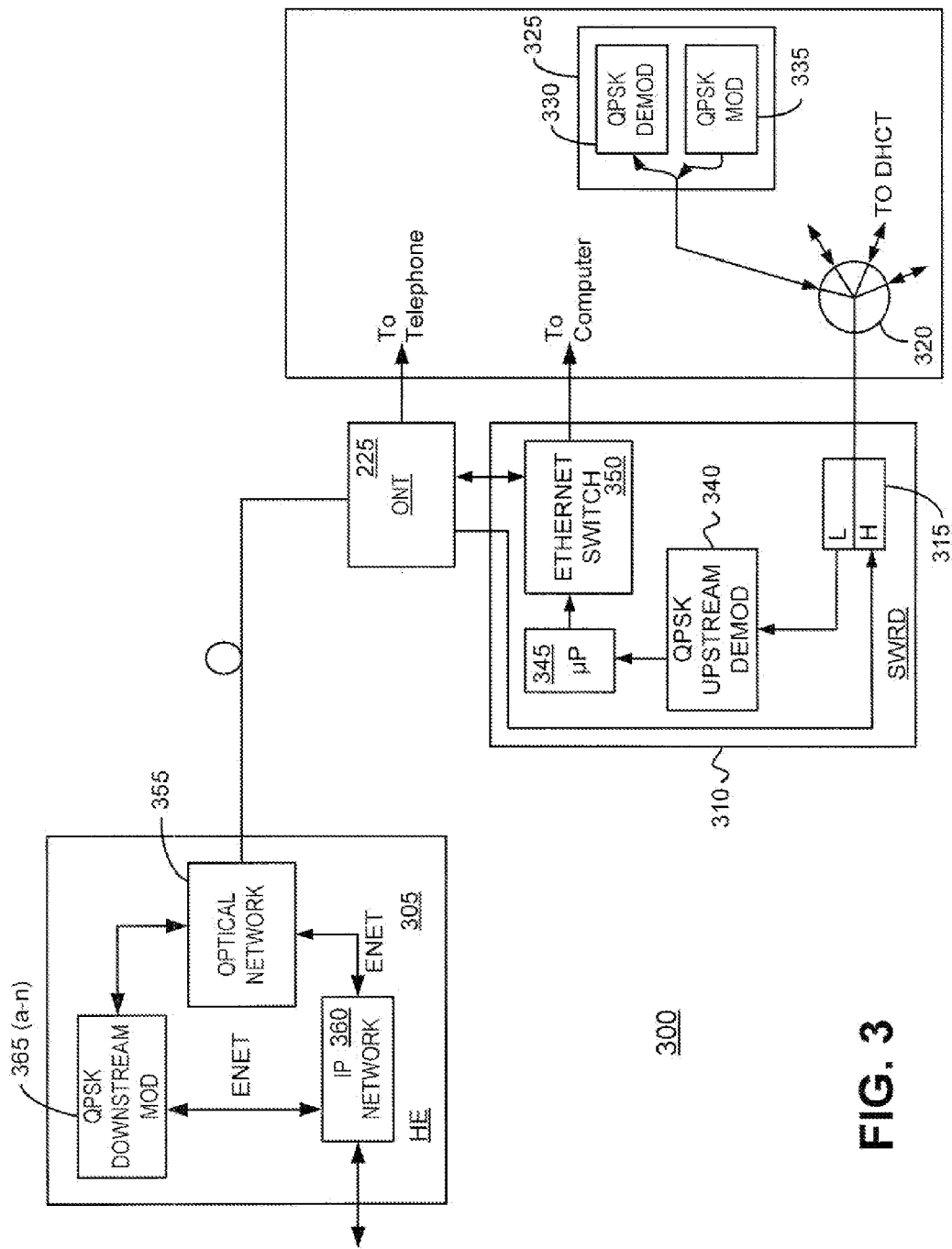
FIG. 3 illustrates the single wire return device in accordance with the present invention in an FTTH system.

FIG. 3 illustrates the single wire return device 310 in accordance with the present invention in an FTTH system 300. In the forward path, the ONT 225 continues to receive optical signals provided by a headend facility 305. Telephone signals are provided directly to connected telephones in a known manner. Ethernet signals and audio/video signals, however, are provided to the SWRD 310. An Ethernet switch 350 is coupled to the ONT 225 that receives and provides Ethernet signals to a computer. Audio/video signals (i.e., RF signals) are provided to a diplex filter 315, where a highpass filter isolates the forward signals, which are typically provided in the range from 45 MHz to 870 MHz. The diplex filter 315 may be coupled to a splitter 320, for example, that then splits the forward signal for transmission to a plurality of DHCTs 325. A QPSK demodulator 330 demodulates the forward signals for subsequent processing.

Figure 1:
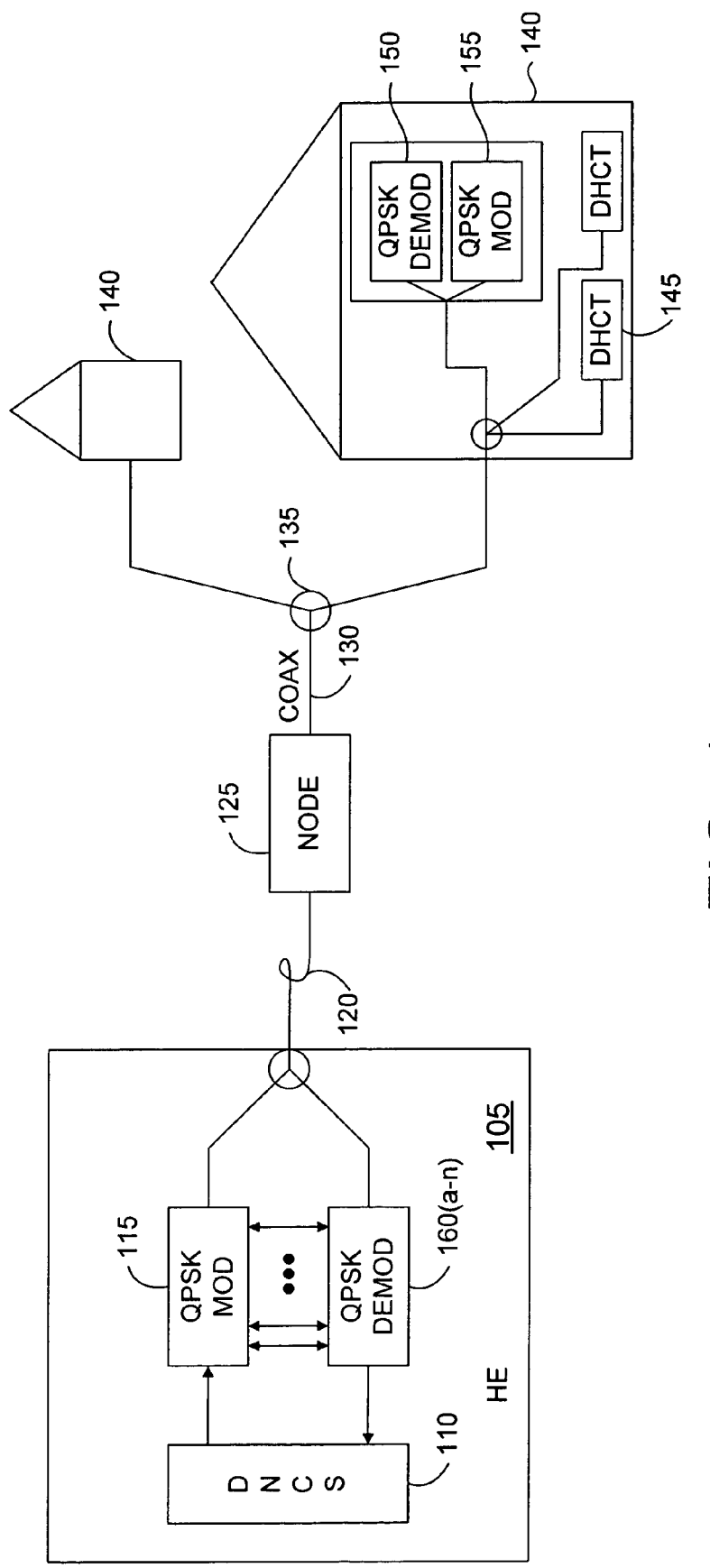
FIG. 1 illustrates a conventional broadband communications system for transmitting video and audio signals.
Figure 2:
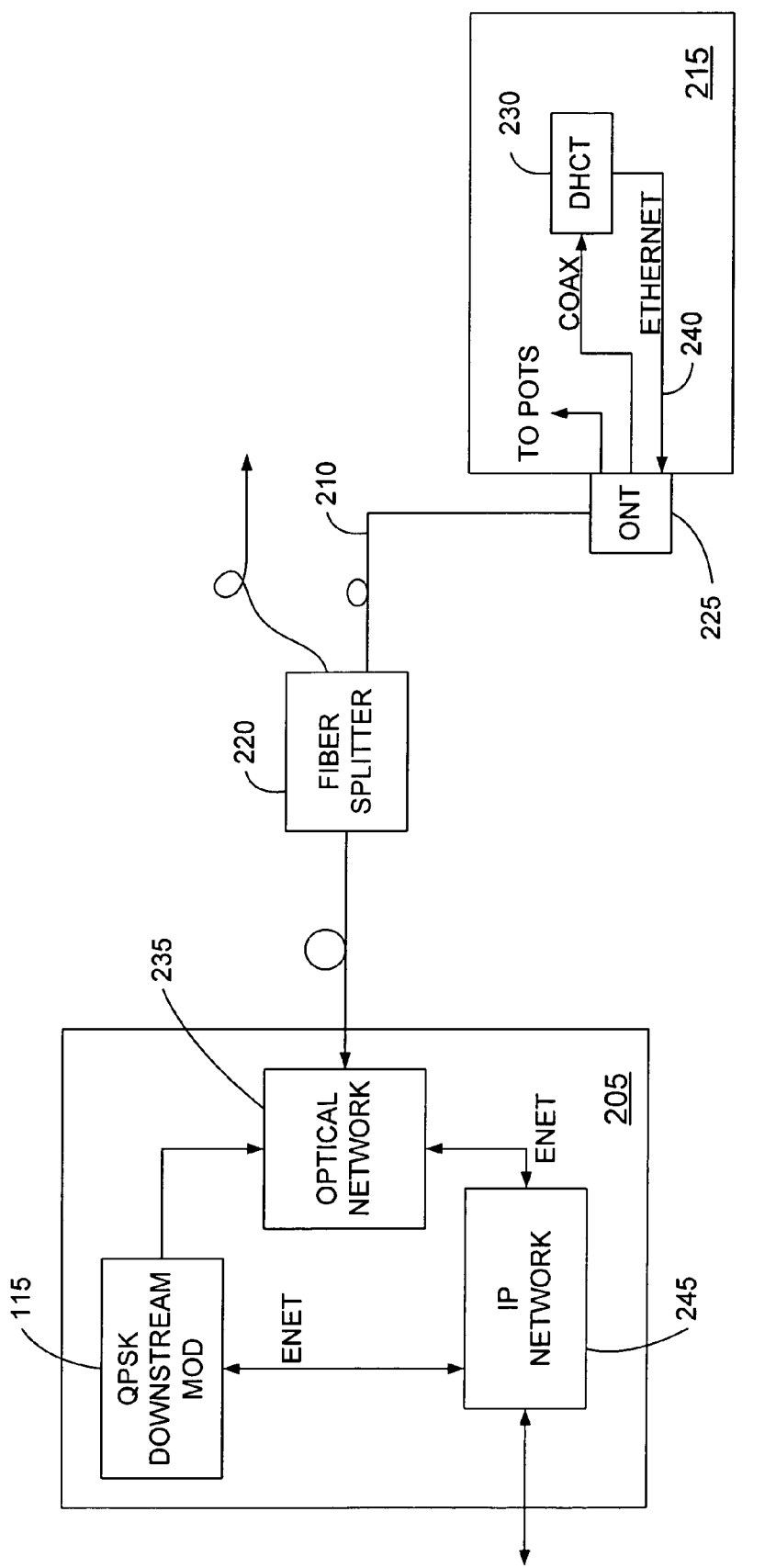
FIG. 2 illustrates an example of a fiber-to-the-home (FTTH) system.

In the reverse path, the DHCTs 325 modulate the reverse signals via a QPSK modulator 335. The modulated RF signals are transmitted from the common forward-reverse coaxial port instead of transmitting reverse Ethernet signals via the Ethernet port as illustrated in FIG. 2. If necessary, the splitter 320 combines the signals from the plurality of DHCTs 325. The reverse signals are provided to the diplex filter 315 and isolated by a low pass filter since reverse signals are typically provided in the range from 5 MHz to 40 MHz. The isolated reverse signals are subsequently provided to a QPSK upstream demodulator 340 for demodulation. A microprocessor 345 then converts the demodulated signals into Ethernet signals. The Ethernet switch 350 then receives the Ethernet signals and combines the reverse signals with other reverse signals, such as signals from the computer located in the premises. The combined signals are subsequently provided to the ONT 225 for conversion to optical signals and transmission over the fiber network.

At the headend facility 305, an optical network 355 receives the reverse optical signals and, via an Internet Protocol network 360, provides the signals either to a QPSK downstream modulator 365 or other processing equipment (not shown). In the event the reverse signals are control messages, such as power calibration of the DHCT 325 or DAVIC sign-on messaging, the QPSK downstream modulator 365 receives the control signals. The QPSK downstream modulator 365 modulates the signals and responds accordingly via the optical network 355.

As mentioned, there are a plurality of downstream modulators 365a-n that typically serve different areas of the system where each area has different multiple upstream demodulators 340. Conventionally, the upstream demodulators 340 were collocated, so there was no problem in identifying which downstream modulator 365a-n needed to respond. In the present invention, however, the downstream modulator 365 is not directly coupled to the upstream demodulator 340, thereby requiring identification of an associated modulator 365a-n.

A preferred embodiment of the present invention utilizes fields in header information and inserts the modulator 365a-n address at the DHCT 325. It will be appreciated that header information attaches to the data packets for several reasons, such as identifying the packets or identifying a specific DHCT 325, to name a couple reasons. Accordingly, in addition to the existing header information, the DHCT 325 adds its associated modulator address to the header information in accordance with the present invention. A DHCT 325 receives its associated downstream modulator 365a-n address, or identification number, at some time and stores that address in memory. The modulator 365a-n identification is then mapped or converted into an IP address prior to transmission by the SWRD 310.

Figure 4:
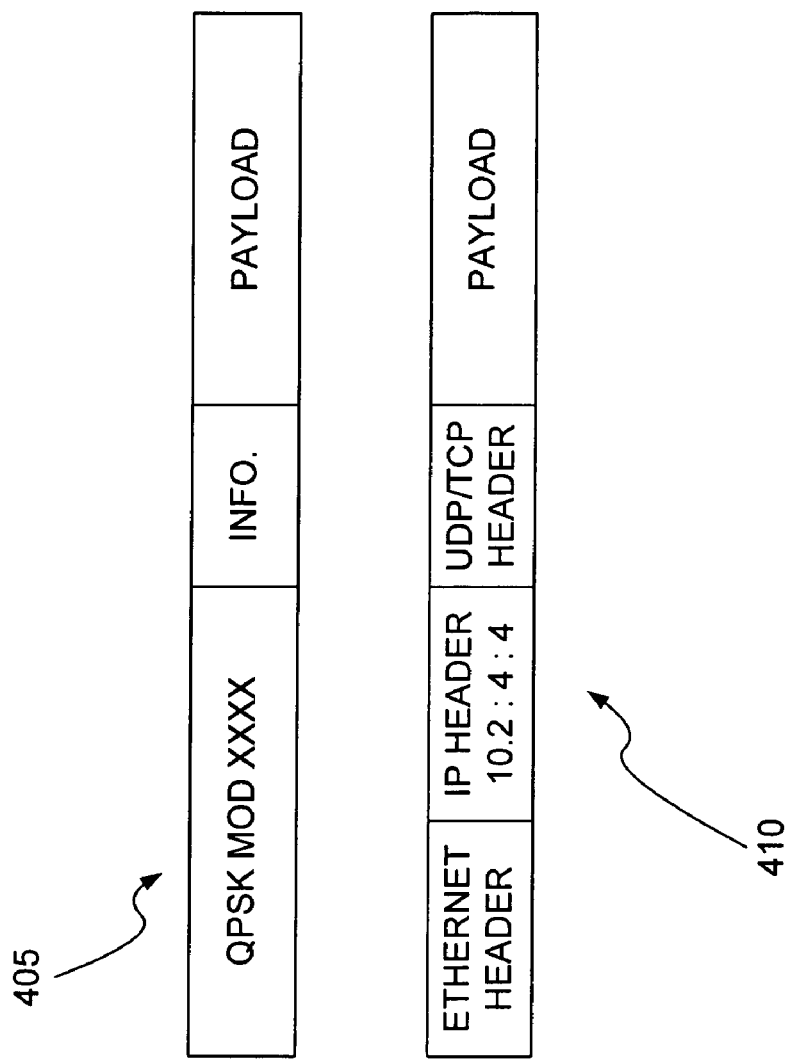
FIG. 4 illustrates an example of a downstream modulator address including additional header information and the payload data that is converted into an IP address.

FIG. 4 illustrates an example of a downstream modulator address 405 including additional header information and the payload data that is converted into the IP address 410. When the DHCT 325 sends a reverse signal, the microprocessor 345 in the SWRD 310 converts the downstream modulator address 405 into an IP address 410. The microprocessor in the SWRD 310 can use the standard 'gethostbyname' to map the modulator ID (identification) into an IP address. The underlying network layer may use various methods to convert the modulator ID into an IP address. These methods include a local table loaded into the SWRD 310 or a Domain Name System (DNS) query.

Accordingly, a system and device has been presented that efficiently transmits reverse signals from a plurality of DHCTs 325 to a QPSK downstream modulator 365. Importantly, the requirement for Ethernet cabling from each DHCT 325 to the ONT 225 has been eliminated. It will be appreciated, however, that related embodiments could be implemented without departing from the scope of the present invention. For example, a different modulation format can be used rather than QPSK. The following claims are intended to capture the invention in light of the detailed information above.

What is claimed is:

1. A fiber-to-the home (FTTH) system, comprising:
   at least one digital home communications terminal (DHCT) for receiving forward signals from a headend facility and for transmitting reverse RF signals to the headend facility, the reverse RF signals including header information and payload data;
   a single wire and return device (SWRD) for receiving the reverse RF signals from the at least one DHCT, demodulating the reverse RF signals via an upstream demodulator, and converting the demodulated signals to Ethernet signals;
   an optical network terminal (ONT) coupled to the SWRD for converting the Ethernet signals to optical signals, and for transmitting the optical signals to the headend facility via optical fiber; and
   a plurality of downstream modulators located in the headend facility remote from the upstream demodulator with each downstream modulator associated with at least one corresponding DHCT and having an identification number that is inserted into the forward signals from the headend facility to identify that downstream modulator to the at least one corresponding DHCT, one of the downstream modulators associated with the at least one DHCT for receiving signals corresponding to the optical signals and for sending the forward signals downstream to the at least one corresponding DHCT via the ONT;

wherein the at least one DHCT inserts the modulator identification number received within the forward signals from the headend facility into the reverse header information, and wherein the SWRD converts the modulator identification number within the reverse header information into an Internet Protocol address to enable the reverse signals to be directed to the one downstream modulator.

2. The FTTH system of claim 1, wherein the SWRD comprises:
a diplex filter coupled for filtering forward signals and the reverse RF signals;
the upstream demodulator coupled to the diplex filter for demodulating the reverse RF signals;
a microprocessor for converting the demodulated signals to Ethernet signals; and
a switch for receiving the Ethernet signals and any additional signals from a second source, the switch for combining the signals and for providing a combined signal to the ONT.

3. The FTTH system of claim 2, wherein the SWRD converts the identification number into the Internet Protocol address via the microprocessor.

4. The FTTH system of claim 1, wherein the ONT receives the forward signals, wherein the forward signals comprise at least one of a telephone signal, Ethernet signals, data signals, and audio/video signals, and wherein the ONT provides the at least one of Ethernet signals, data signals, and audio/video signals to the SWRD and provides the telephone signals to a connected telephone.

5. A method for transmitting reverse signals in a fiber-to-the-home (FTTH) network, the FTTH network including a forward path and a reverse path, the method comprising:
receiving forward signals from a headend facility and generating a reverse RF modulated signal in a digital host communications terminal (DHCT), wherein a plurality of downstream modulators are located in the headend facility with each downstream modulator associated with at least one corresponding DHCT and having an identification number that is inserted into the forward signals from the headend facility to identify that downstream modulator, and wherein the reverse RF modulated signal includes the identification number of the downstream modulator associated with the DHCT in header information;
providing the reverse RF modulated signal via coaxial cable to a single wire return device (SWRD);
demodulating the reverse RF modulated signal via coaxial cable to a single wire return device (SWRD);
demodulating the reverse RF modulated signal via an upstream demodulator remote from the plurality of downstream modulators to provide a reverse demodulated signal;
processing the reverse demodulated signal to provide a reverse Ethernet signal, wherein the identification number is converted into an Internet Protocol address that enables the reverse Ethernet signal to be directed to the associated downstream modulator;
converting the reverse Ethernet signal to a reverse optical signal in an optical network terminal (ONT); and
receiving signals corresponding to the reverse optical signal at the associated downstream modulator located in the headend facility, wherein the downstream modulator transmits a forward signal to the at least one corresponding DHCT via the ONT in response to the received reverse optical signal.

6. The method of claim 5, wherein the DHCT stores the identification number and inserts the received identification number into the reverse header information prior to transmitting to the SWRD.

7. The method of claim 5, further comprising:
receiving the forward signals at the ONT, wherein the forward signals comprise at least one of a telephone signal, Ethernet signals, data signals, and audio/video signals, and wherein the ONT provides the at least one of Ethernet signals, data signals, and audio/video signals to the SWRD and provides the telephone signals to a connected telephone.

* * * * *

UNITED STATES PATENT AND TRADEMARK OFFICE
CERTIFICATE OF CORRECTION

| | |
|---|---|
| PATENT NO. | : 7,596,801 B2 |
| APPLICATION NO. | : 10/671151 |
| DATED | : September 29, 2009 |
| INVENTOR(S) | : Wall et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Fourteenth Day of December, 2010

David J. Kappos
*Director of the United States Patent and Trademark Office*